United States Patent [19]

Hempsey

[11] 4,110,818

[45] Aug. 29, 1978

[54] ILLUMINATED FLAG OR PENNANT

[76] Inventor: Raymond Hempsey, 248 Watkins St., Philadelphia, Pa. 19148

[21] Appl. No.: 828,623

[22] Filed: Aug. 29, 1977

[51] Int. Cl.² ............................................. F21V 7/04
[52] U.S. Cl. .................................... 362/32; 362/211; 362/252; 362/431
[58] Field of Search ............... 240/2 R, 1 LP; 362/32, 362/211, 252, 431

[56] References Cited

U.S. PATENT DOCUMENTS 3,857,361  12/1974  Gibson et al. .................... 240/1 LP

*Primary Examiner*—Stephen J. Lechert, Jr.
*Attorney, Agent, or Firm*—Robert D. Farkas

[57] ABSTRACT

An illuminated flag or pennant adapted to be affixed to the radio antenna of a moving vehicle such as a boat or automobile and is adapted to receive electrical energy therefrom includes means of coupling to the source of electrical energy and a fiber optic cable which couples electrical energy which has been converted to light energy to the flag at selected areas forming predetermined indicia which may be the radio operators call letters or handle.

10 Claims, 4 Drawing Figures

ILLUMINATED FLAG OR PENNANT

BACKGROUND OF THE INVENTION

1. Field of the Invention

The present invention relates to flags or pennants, and more particularly, to an illuminated flag or pennant which is capable of indicating the call letters and/or handle of a radio operator in darkness.

2. Description of the Prior Art

The prior art abounds with mechanical assemblies used to mount flags or pennants on wheeled vehicles in a multiplicity of configurations. The present invention, however, is not related to the mount means of the mast assembly as shown in the prior art, for example as disclosed in U.S. Pat. No. 3,762,360 issued to Edward L. Hawes on Oct. 2, 1973 and U.S. Pat. No. 3,136,2989 issued to Edward E. Johnson on June 9, 1964.

The present invention is directed to the flag or pennant which may be affixed to any suitable vertically mounted pole or shaft, and in particular it is intended that the pennant of the present invention be affixed to the radio antenna used by "CB" radio operators, but is not so limited.

At present there are many civilian broadcasters or "CB'ers" who desire to have their call letters or "handles" made available to other operators who may be passing by their moving vehicles. Thus other CB operators viewing the sign will be invited to call the advertised station on the airways and chat with them. At present a radio operator utilizes the rear window or bumper of his vehicle to install indicia indicating his station letters and/or handle. However, in darkness these areas are not visible to someone passing by and thus do not serve their intended purpose.

SUMMARY OF THE INVENTION

Therefore, a primary object of the present invention is to provide a flag or pennant which may be visible in darkness.

A further object of the present invention is to provide a flag or pennant which may be readily affixed to the radio antenna presently used on a vehicle.

A still further object of the present invention is to provide a means of displaying the radio station call letters and/or handle of the radio operator.

Still another object of the present invention is to provide an attractive inexpensive means of adornment for a vehicle.

These objects, as well as further objects and advantages, of the present invention will become readily apparent after reading the description of a non-limiting illustrative embodiment and the accompanying drawing.

An illuminated flag or pennant or the like adapted for attachment to an existing radio antenna having a source of electrical energy proximate thereto, according to the principles of the present invention, comprises in combination, means of coupling to the source of electrical energy, fiber optic calbe means with one end thereof receiving light energy generated by said source of electrical energy, and flag means having thereon indica formed by the filaments of the fiber optic cable other end.

BRIEF DESCRIPTION OF THE DRAWINGS

In order that the present invention may be more fully understood it will now be described, by way of example, with reference to the accompanying drawing in which.

DESCRIPTION OF THE PREFERRED EMBODIMENT

Figures 1, 2, 3, 4:
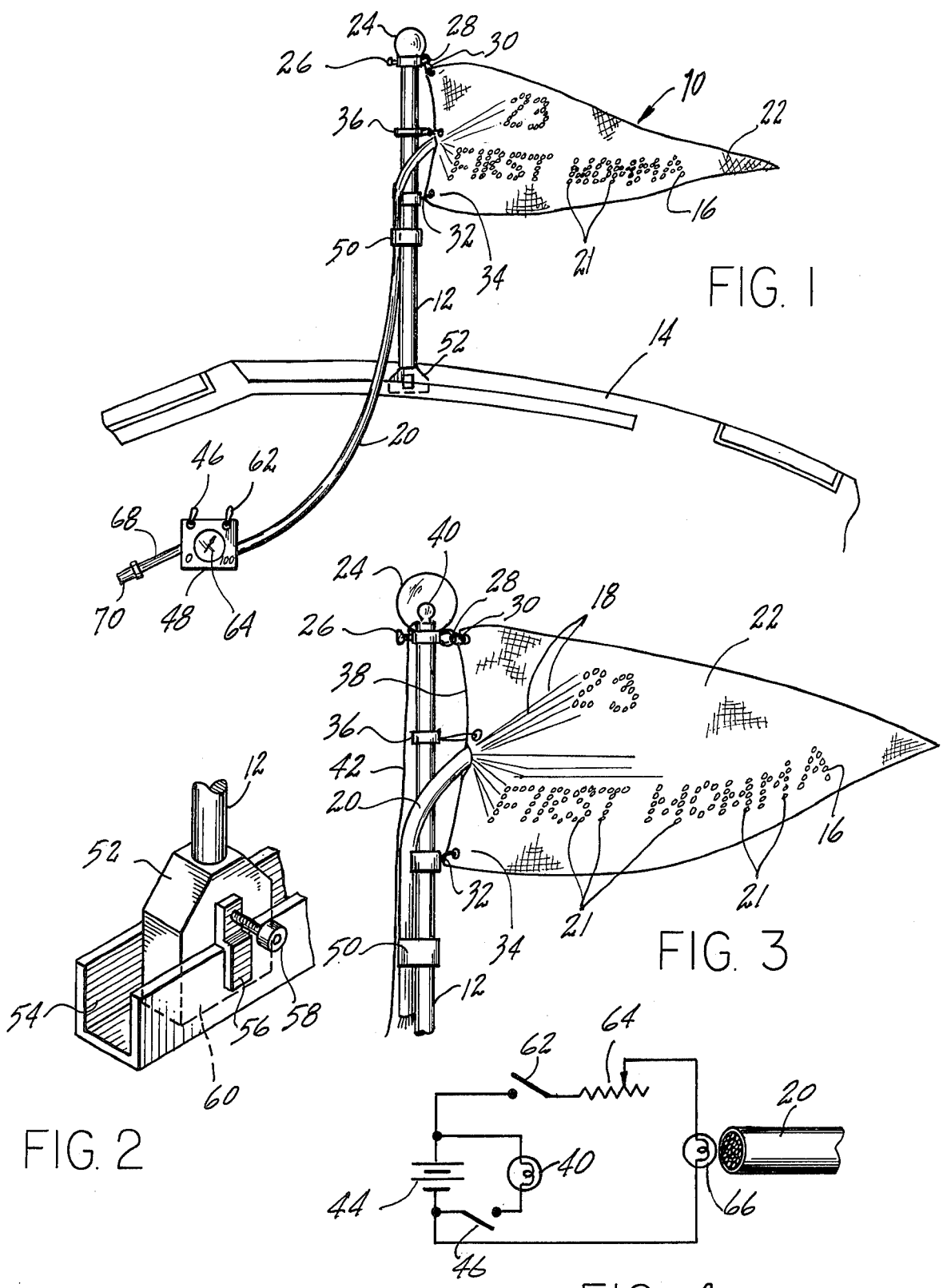
FIG. 1 is a pictorial representation of the pennant of the present invention mounted on the antenna disposed on the upper portion of an automobile roof.
FIG. 2 is an enlarged partial view of the mounting bracket affixed to the rain gutter of the automobile shown in FIG. 1.
FIG. 3 is an enlarged pictorial representation of the pennant of the present invention showing the fibers of the fiber optic cable dispersed to form the indicia known as a handle.
FIG. 4 is a schematic circuit diagram of the energy source and light generated therewith coupled to one end of the fiber optic cable.

Referring now to the drawing, and more particularly to FIGS. 1 and 2 thereof, there is illustrated a flag or pennant 10 which is affixed to a shaft or pole 12 mounted on the roof portion 14 of an automobile. It is to be understood that although the preferred embodiment is described as being mounted on the roof portion of an automobile it may just as readily be affixed to an existing antenna whether it be on an automobile a boat. Preferably the pennant 10 is affixed to the CB antenna which is presently found on many vehicles. Although the illustration shows the mounting of the antenna or pole 12 to the roof of an automobile, it is apparent to those knowledgeable in the art that such antenna may be placed on the rear trunk of the automobile or the upper portion of the front fender of the automobile not shown.

The pennant is provided with indicia thereon 16, which in the present embodiment is "first monna" and may include the preferred channel of operation which is shown as the numeral 23. The indicia 16 to appear on the flag or pennant 10 is determined at the time of manufacture of the flag and may comprise either letters or numerals depending upon the desires of the purchaser. The indicia 16 is formed by having the filaments 18 of fiber optic cable 20 flattened and dispersed over a relatively large area. The ends 21 of the fiber are cut and held in position in a conventional manner, forming the indicia desired. They may be affixed to the cloth or plastic portion 22 by adhesive or any suitable means carefully insuring that the edges of the filament 18 are free of any coatings. It is desired that both sides of the flag 10 be illuminated it will be necessary to divide the fiber optic cable into two bundles at the point of reaching the cloth or plastic portion 22 so that half of the fibers can be cut and affixed to one side of the cloth while the other half of the fiber ends can be affixed to a second cloth placed on the opposite side thereof forming a sandwich effect with the fibers of the cable therebetween. For clarity and ease of explanation the preferred embodiment will be described as if all of the fiber optic filaments are affixed on one side of cloth 22.

The uppermost edge of cloth 22 is provided at one end with a cap 24 for attachment to the uppermost tip of a shaft 12 which may be a CP radio antenna. The cap 24 is provided with a set screw or nut 26 which allows tightening against the shaft 12 thus preventing the cap from rotating with the wind. The cap 24 is also provided with a ring portion 28 which is adapted to receive a conventional type of clip 30 fastened to the uppermost corner of the cloth 22. An additional clip 32 is provided in the lower end portion 34 of the cloth background 22. Clip 32 is adapted to rotatably fasten to the shaft 12 and helps keep the flag or pennant in an upright condition. A further support 36 may be fastened to the central portion of the vertically extending edge 38 of the cloth background 22 and is clipped to shaft 12 to help hold the pennant 10 thereto.

The cap 24 may further include an incandescent light 40 affixed therein which may be energized via a wire 42 connected to the source of electrical energy, which is the vehicle battern 44 shown in FIG. 4. A switch 46 mounted in the control device 48 may be used to turn lamp 40 on and off. A further clamp 50 may be used to hold the fiber optic cable 20 to the antenna or shaft 12 thereby reducing vibration while the vehicle is in motion.

The shaft 12 may be a conventional base mount or a CB antenna not shown or it may be of the type shown in FIG. 2 having an elongated rectangularly-shaped portion 52 adapted to be mounted in the rain gutter 54 of an automobile, not shown. The rectangularly-shaped portion 52 is held within rain gutter 54 by means of a clamp 56 which is tightened in a conventional manner by screw 58. The lowermost edge 60 of rectangularly-shaped portion 52 prevents the shaft from tilting with the vehicle movement since it is locked into position by the aid of clamp 56 and screw 58.

Referring now to FIG. 4 which shows an electrical schematic of the contents of the control device 48 (FIG. 1) mentioned earlier. The battery 44 is the normal battery found in a vehicle which is used for starting, and is generally recharged by the generator of the vehicle not shown. The control unit may be provided with an additonal switch 62 and a control potentiometer 64 which is adapted to vary the amount of current flowing into incandescent lamp 66 disposed within the housing of control device 48. The fiber optic cable 20 is affixed to the control device 48 and extends thereinto close proximity with lamp 66, thus when the incandescent lamp 66 is illuminated by closing switch 62 the light eminating therefrom will travel up the fiber optic cable and exit at the ends of the filaments forming the indicia. FIG. 4 shows a direct connection to the battery 44 however it is understood that the control unit 48 may be provided with a wire 68 and a conventional cigarette lighter plug 70 adapted to be received by the cigarette lighter receptical in the vehicle. If a vehicle is not provided with such a receptical then direct connection of wire 68 may be made to the battery 44.

In operation, once connection has been made to the battery terminals by either inserting plug 7 into the receptical provided or by connecting wire 68 directly to the battery terminals switch 46 will enable incandescent lamp 40 to be illuminated when it is closed. Switch 62 upon closure will illuminate incandescent lamp 66 thus illuminating the indicia occurring on the pennant 10. The amount of light emanating from the incandescent lamp 66 and traveling up fiber optic cable 20 and emanating from the ends of filaments 18 is controlled by the position of control potentiometer 64. By placing control 64 at the minimum or zero position the maximum amount of light will emanate from the indicia on the flag or pennant 10. Rasing the control potentiometer to position 100 will increase the amount of resistance placed in series with lamp 66 thus causing it to emanate lower amounts of light and reducing the amount of light available from the flag 10.

It is apparent to one skilled in the art that the material specified for a flag or pennant may be varied in accordance with the desires of the individual and any number of means may be be provided to fasten the fibers of the fiber optic cable thereto.

Therefore a primary advantage of the present invention is to provide an inexpensive means for indicating or inviting other CB radio operators to contact the owner and user of the present invention.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. An illuminated flag comprising a flexible sheet-like flag having opposed lateral surfaces, means for attachment of said flag to an existing radio antenna having a source of electrical energy approximate thereto, an electrically operated light source, means for coupling said light source to said source of electrical energy, fiber optic cable means, one end of said fiber optic cable means being disposed receiving light energy generated by said source of light, the other end of said fiber optic cable means being distributed such that the free ends of the individual fiber optic filaments of said fiber optic cable means are disposed along at least one said lateral surface so as to be visually accessable to a user and arranged such that said free ends form indicia.

2. An illuminated flag, according to claim 1, further comprising a cap means for attachment to the uppermost tip of said radio antenna, clip means disposed along one edge of said flag for attachment to said antenna and retaining said flag thereto.

3. An illuminated flag according to claim 1, wherein said means for coupling said source of light includes means for adjusting the amount of light energy output of said source.

4. An illuminated flag according to claim 1, wherein said filaments of said fiber optic cable means have said free ends thereof distributed on each of said lateral surfaces such that said indicia is formed by said free ends on said each of said lateral surfaces.

5. An illuminated flag according to claim 2, wherein said cap means is illuminated.

6. An illuminated flag according to claim 2, wherein said cap means includes means for preventing said flag from rotating about said antenna.

7. An illuminated flag according to claim 1, further including said at least one lateral surface having a relatively dark colored area surrounding said free ends of said fiber optic filaments.

8. An illuminated flag according to claim 1, wherein said indicia is a radio station identification.

9. An illuminated flag according to claim 1, wherein said indicia is a radio operator's name.

10. An illuminated flag according to claim 1, further comprising means to support said fiber optic cable along a portion of the length of said existing radio antenna.

* * * * *